US012354167B2

(12) United States Patent
Willis et al.

(10) Patent No.: US 12,354,167 B2
(45) Date of Patent: Jul. 8, 2025

(54) SYSTEMS AND METHODS FOR ACCURACY-ENHANCED PROCESSING OF QUERY DATA WITHIN A MULTI-DIGITAL AGENT ARCHITECTURE

(71) Applicant: PocketNest, Inc., Royal Oak, MI (US)

(72) Inventors: Jessica Willis, Huntington Woods, MI (US); Chris Wascha, Birmingham, MI (US); Yiping Kang, Ann Arbor, MI (US); Jason Mars, Ann Arbor, MI (US)

(73) Assignee: PocketNest, Inc., Royal Oak, MI (US)

( * ) Notice: Subject to any disclaimer, the term of this patent is extended or adjusted under 35 U.S.C. 154(b) by 0 days.

(21) Appl. No.: 19/067,102

(22) Filed: Feb. 28, 2025

(65) Prior Publication Data

US 2025/0200665 A1    Jun. 19, 2025

Related U.S. Application Data

(63) Continuation-in-part of application No. 16/864,599, filed on May 1, 2020, now abandoned.

(60) Provisional application No. 63/764,964, filed on Feb. 28, 2025.

(51) Int. Cl.
  *G06Q 40/06* (2012.01)
  *G06Q 10/0631* (2023.01)
  *G06Q 40/02* (2023.01)

(52) U.S. Cl.
  CPC ....... *G06Q 40/06* (2013.01); *G06Q 10/06311* (2013.01); *G06Q 40/02* (2013.01)

(58) Field of Classification Search
  CPC ... G06Q 40/06; G06Q 10/06311; G06Q 40/02

USPC .......................................................... 705/35
See application file for complete search history.

(56) References Cited

U.S. PATENT DOCUMENTS

| | | | | |
|---|---|---|---|---|
| 10,705,796 | B1* | 7/2020 | Doyle | G06F 16/282 |
| 11,836,170 | B1* | 12/2023 | Tao | G06F 16/3329 |
| 2003/0149704 | A1* | 8/2003 | Yayoi | G06F 16/3326 |
| | | | | 707/999.102 |

(Continued)

OTHER PUBLICATIONS

"Esign and implementation of an Architectural Framework for Web Portals in a Ubiquitous Persuasive Environment", Pumed Central Publication, Digital Object Identifier: 10.3390/s90705201, ISSSN: 1424-8220, Sep. 2, 2009 (Year: 2009).*

(Continued)

*Primary Examiner* — Frantzy Poinvil
(74) *Attorney, Agent, or Firm* — Padowithz Alce; Alce PLLC

(57) ABSTRACT

A system and method for accuracy-enhanced processing of query data within a multi-digital agent architecture may include receiving unrefined query data including textual data; retrieving historical user dialogue data from a computer database associated with the unrefined query data; transforming the unrefined query data to refined query data based on the retrieved historical user dialogue data; generating at least one digital agent classification inference using the refined query data; routing the refined query data to a digital agent based on the at least one digital agent classification inference; generating, by the digital agent, a digital response to the unrefined query data; and returning the digital response to an interactive graphical user interface.

20 Claims, 8 Drawing Sheets

(56) References Cited

U.S. PATENT DOCUMENTS

2014/0244634 A1* 8/2014 Duleba ................ G06F 16/951 707/724
2021/0232615 A1* 7/2021 Hoffmann ............ G06F 16/254
2022/0036302 A1* 2/2022 Cella ...................... G06N 20/00

OTHER PUBLICATIONS

"Large Language Model-Brained GUI Agents: A Survey", Arxuv Article, arxiv.org, Arxiv ID: 2411.18279, Year Nov. 27, 2024 (Year: 2024).*

* cited by examiner

SYSTEMS AND METHODS FOR ACCURACY-ENHANCED PROCESSING OF QUERY DATA WITHIN A MULTI-DIGITAL AGENT ARCHITECTURE

CROSS-REFERENCE TO RELATED APPLICATIONS

This application claims the benefit of U.S. Provisional Application No. 69/387,037, filed on 28 Feb. 2025, and is a Continuation-in-Part of U.S. patent application Ser. No. 16/864,599, filed 1 May 2020, which are incorporated in their entireties by this reference.

TECHNICAL FIELD

This invention relates generally to a multi-digital agent architecture and more specifically, to a new and useful system and method for intelligent routing of a query to a digital agent within a multi-digital agent architecture for response generation.

BACKGROUND

Conversational artificial intelligence (AI) systems may be used in a wide variety of applications for automating interactions with a user. Traditional backend architectures for these systems may utilize a single digital agent that receives a query from a user and generates a response to the query. However, such systems may fail to accurately interpret queries submitted by users that ambiguous or incomplete and may further suffer from latency issues associated retrieving contextual information used in generating the response. The techniques described herein may enable improved system performance when user queries are ambiguous or incomplete and may reduce latency associated with generating a response to a user query.

BRIEF SUMMARY OF THE INVENTION(S)

In some embodiments, a computer-implemented method for an accuracy-enhanced processing of query data within a multi-digital agent architecture may comprise: at an adaptive query data processing service that is implemented by a network of distributed computers: receiving, via a computer network, unrefined query data comprising textual data; converting, by one or more computers executing one or more embeddings models, the unrefined query data to a set of embeddings of the unrefined query data; using the set of embeddings to perform a search of a computer database storing historical user dialogue data, automatically generating, by the one or more computers, a language model prompt based on a combination of the unrefined query data and given historical user dialogue data returned as a result of performing the search; transforming, by one or more language models, the unrefined query data to refined query data based on an input of the language model prompt to the one or more language models, wherein the refined query data comprises improved query data that is restructured from the unrefined query data to enable an accurate processing by a downstream digital agent classification system, generating, by one or more computers executing a digital agent classification model of the digital agent classification system, at least one digital agent classification inference based on an input of embeddings of the refined query data; automatically applying to the refined query data, by the one or more computers executing the digital agent classification system, digital routing logic that, when applied: automatically causes the one or more computers to select or identify a distinct digital agent of a plurality of digital agents for processing the refined query data of the adaptive query data processing service, and automatically routes the refined query data to the distinct digital agent of the plurality of digital agents of the adaptive query data processing service; automatically instantiating an instance of the distinct digital agent for executing an accuracy-enhanced processing of the refined query data; executing the accuracy-enhanced processing of, by the one or more computers executing the distinct digital agent, the refined query data; and in response to the accuracy-enhanced processing, generating by the one or more computers executing the distinct digital agent a digital response to the unrefined query data; and returning, via the computer network, the digital response to an interactive graphical user interface that is in operable communication with the adaptive query data processing service.

In some embodiments of the computer-implemented method: the digital agent classification system was initialized prior to generating the at least one digital agent classification inference, the initialization comprising: retrieving from computer memory, for each digital agent of the plurality of agents, a respective agent textual description data; generating a respective language model prompt for each respective agent textual description data; converting, by the one or more computers executing the one or more language models, each respective agent textual description data into a respective set of embeddings based on an input of each language model prompt; and storing the respective set of embeddings for each digital agent at one or more reference memories accessible to the one or more language models associated with the digital agent classification system.

In some embodiments, the computer-implemented method may further comprise: retrieving, by the one or more computers executing the one or more language models of the digital agent classification system from the one or more memories, the respective set of embeddings for each digital agent, wherein generating the at least one digital agent classification inference comprises: generating, by the one or more computers of the digital agent classification system, a respective digital agent classification inference for each digital agent based at least in part on the sets of embeddings retrieved for the digital agents and the embeddings of the refined query data; and applying, by the one or more computers of the digital agent classification system, agent selection logic to the digital agent classification inferences to output an indication of the digital agent associated with one of the digital agent classification inferences, wherein the refined query data is routed to the indicated digital agent.

In some embodiments, the computer-implemented method may further comprise: encoding the one or more memories accessible by the digital agent classification system with the agent selection logic, wherein applying the agent selection logic comprises: retrieving, by the one or more computers of the digital agent classification system, the agent selection logic; and executing the agent selection logic by the one or more computers of the digital agent classification system to select or identify the distinct digital agent.

In some embodiments of the computer-implemented method, the agent selection logic comprises: a set of agent selection parameters defining one or more agent selection threshold values or one or more agent selection value ranges that aid in selecting a digital agent using a digital agent classification inference, one or more agent selection heuristics defining a set of rules for selecting the digital agent using the digital agent classification inference, or executable instructions configured to automatically select the digital agent using the digital agent classification inference.

In some embodiments, the computer-implemented method further comprises: retrieving, from the computer memory, given textual description data indicating one of the digital agents as a default fallback digital agent; automatically generating a given language model prompt based on the retrieved textual description data; converting, by the one or more computers executing the one or more language models, the given textual description data into a second set of embeddings based on an input of the given language model prompt; and storing the second set of embeddings for the default fallback digital agent at the one or more reference memories, wherein the stored second set of embeddings aids the adaptive query data processing service in routing the refined query to the fallback digital agent by increasing a probability that the agent classification model successfully classifies the refined query to the default fallback digital agent.

In some embodiments of the computer-implemented method, transforming the unrefined query data to refined query data comprises: interjecting, into tokens of the unrefined query data, agent-indicative tokens, wherein the embeddings of the refined query data are generated from the tokens of the unrefined query data and the agent-indicative tokens.

In some embodiments of the computer-implemented method, the digital classification model comprises one or more predictive layers comprising a plurality of weights, and the agent-indicative tokens, when included in the refined query data, enable improved classification accuracy in the digital agent classification by increasing a quantity of the plurality of weights that are activated for the distinct digital agent, thus increasing a probability that the digital agent classification model successfully classifies the refined query data to the distinct digital agent.

In some embodiments of the computer-implemented method, the agent-indicative tokens are derived from embeddings of the historical user dialogue data.

In some embodiments of the computer-implemented method, the computer-implemented method further comprises: retrieving, from computer memory, one or more data samples, each data sample comprising respective unrefined query data and labeled with respective expected refined query data; transforming, by the one or more language models for each data sample, the respective unrefined query data into candidate refined query data; adjusting one or more weights of the one or more language models based at least in part on the respective candidate query data and the respective expected refined query for each data sample of the one or more data samples.

In some embodiments of the computer-implemented method, the computer-implemented method further comprises converting, by one or more computers executing the one or more embeddings models, the digital response to a second set of embeddings of the digital response; and storing the set of embeddings of the unrefined query data and the second set of embeddings of the digital response at the computer database.

In some embodiments of the computer-implemented method, the computer-implemented method further comprises: receiving, via the computer network, second unrefined query data comprising additional textual data; converting, by one or more computers executing the one or more embeddings models, the second unrefined query data to a third set of embeddings of the second unrefined query data; using the set of embeddings to perform a search of the computer database storing second historical user dialogue data, the second historical user dialogue data comprising one or more of the unrefined query data or the digital response.

In some embodiments of the computer-implemented method, the computer-implemented method further comprises: extracting, from one or more data sources associated with the distinct digital agent, contextual data for the distinct digital agent; automatically generating, by the one or more computers, a second language model prompt based on a combination of the refined query data and the contextual data; and outputting, by the one or more language models, the digital response based at least in part on a provision of the second language model prompt to the one or more language models.

In some embodiments of the computer-implemented method, automatically generating the second language model prompt comprises: generating the second language model prompt based on a combination of the refined query data, the contextual data, a first textual description of the distinct digital agent, and a second textual description indicating a set of rules for the distinct digital agent to follow.

In some embodiments, the computer-implemented method further comprises: retrieving, from the one or more data sources, the contextual data based at least in part on each of one or more sets of embeddings associated with the contextual data being within a predefined threshold vector distance of the embeddings of the refined query data.

In some embodiments, the computer-implemented method further comprises: retrieving, from the computer database, the historical user dialogue data based at least in part on each of one or more sets of embeddings stored within the computer database that represent the historical dialogue data being within a predefined threshold vector distance of the set of embeddings of the unrefined query data.

In some embodiments, each digital agent of the plurality of digital agents is implemented by at least one specially configured computer of the distributed network of computers that is encoded with unique logic for automatically executing one or more tasks based on a processing of the refined query, the at least one specially configured computer operably controlled by an instantiation signal from the one or more computers executing the digital agent classification system.

In some embodiments, a computer-program product for an accuracy-enhanced processing of query data within a multi-digital agent architecture may comprise a non-transitory machine-readable storage medium storing computer instructions that, when executed by one or more processors, perform operations comprising: at an adaptive query data processing service that is implemented by a network of distributed computers: receiving, via a computer network, unrefined query data comprising textual data; converting, by one or more computers executing one or more embeddings models, the unrefined query data to a set of embeddings of the unrefined query data; using the set of embeddings to perform a search of a computer database storing historical user dialogue data, automatically generating, by the one or more computers, a language model prompt based on a combination of the unrefined query data and given historical user dialogue data returned as a result of performing the search; transforming, by one or more language models, the unrefined query data to refined query data based on an input of the language model prompt to the one or more language models, wherein the refined query data comprises improved query data that is restructured from the unrefined query data to enable an accurate processing by a downstream digital agent classification system, generating, by one or more computers executing a digital agent classification model of the digital agent classification system, at least one digital agent classification inference based on an input of embeddings of the refined query data; automatically applying to the refined query data, by the one or more computers executing the digital agent classification system, digital routing logic that, when applied: automatically causes the one or more computers to select or identify a distinct digital agent of a plurality of digital agents for processing the refined query data of the adaptive query data processing service, and automatically routes the refined query data to the distinct digital agent of the plurality of digital agents of the adaptive query data processing service; automatically instantiating an instance of the distinct digital agent for executing an accuracy-enhanced processing of the refined query data; executing the accuracy-enhanced processing, by the one or more computers executing the distinct digital agent, the refined query data; and in response to the accuracy-enhanced processing, generating by the one or more computers executing the distinct digital agent a digital response to the unrefined query data; and returning, via the computer network, the digital response to an interactive graphical user interface that is in operable communication with the adaptive query data processing service.

In some embodiments of the computer-program product, the digital agent classification system was initialized prior to generating the at least one digital agent classification inference, and the computer instructions, when executed by the one or more processors, perform initialization operations, the initialization operations comprising: retrieving from computer memory, for each digital agent of the plurality of agents, a respective agent textual description data; generating a respective language model prompt for each respective agent textual description data; converting, by the one or more computers executing the one or more language models, each respective agent textual description data into a respective set of embeddings based on an input of each language model prompt; and storing the respective set of embeddings for each digital agent at one or more reference memories accessible to the one or more language models associated with the digital agent classification system.

In some embodiments, a computer-implemented system for an accuracy-enhanced processing of query data within a multi-digital agent architecture may comprise: one or more processors; a memory; and a computer-readable medium operably coupled to the one or more processors, the computer-readable medium having computer-readable instructions stored thereon that, when executed by the one or more processors, cause a computing device to perform operations comprising: at an adaptive query data processing service that is implemented by a network of distributed computers: receiving, via a computer network, unrefined query data comprising textual data; converting, by one or more computers executing one or more embeddings models, the unrefined query data to a set of embeddings of the unrefined query data; using the set of embeddings to perform a search of a computer database storing historical user dialogue data, automatically generating, by the one or more computers, a language model prompt based on a combination of the unrefined query data and given historical user dialogue data returned as a result of performing the search; transforming, by one or more language models, the unrefined query data to refined query data based on an input of the language model prompt to the one or more language models, wherein the refined query data comprises improved query data that is restructured from the unrefined query data to enable an accurate processing by a downstream digital agent classification system, generating, by one or more computers executing a digital agent classification model of the digital agent classification system, at least one digital agent classification inference based on an input of embeddings of the refined query data; automatically applying to the refined query data, by the one or more computers executing the digital agent classification system, digital routing logic that, when applied: automatically causes the one or more computers to select or identify a distinct digital agent of a plurality of digital agents for processing the refined query data of the adaptive query data processing service, and automatically routes the refined query data to the distinct digital agent of the plurality of digital agents of the adaptive query data processing service; automatically instantiating an instance of the distinct digital agent for executing an accuracy-enhanced processing of the refined query data; executing the accuracy-enhanced processing, by the one or more computers executing the distinct digital agent, the refined query data; and in response to the accuracy-enhanced processing, generating by the one or more computers executing the distinct digital agent a digital response to the unrefined query data; and returning, via the computer network, the digital response to an interactive graphical user interface that is in operable communication with the adaptive query data processing service.

DESCRIPTION OF THE PREFERRED EMBODIMENTS

The following description of the preferred embodiments of the inventions are not intended to limit the inventions to these preferred embodiments, but rather to enable any person skilled in the art to make and use these inventions.

1.10 Adaptive Query Data Processing Service

Figure 1:
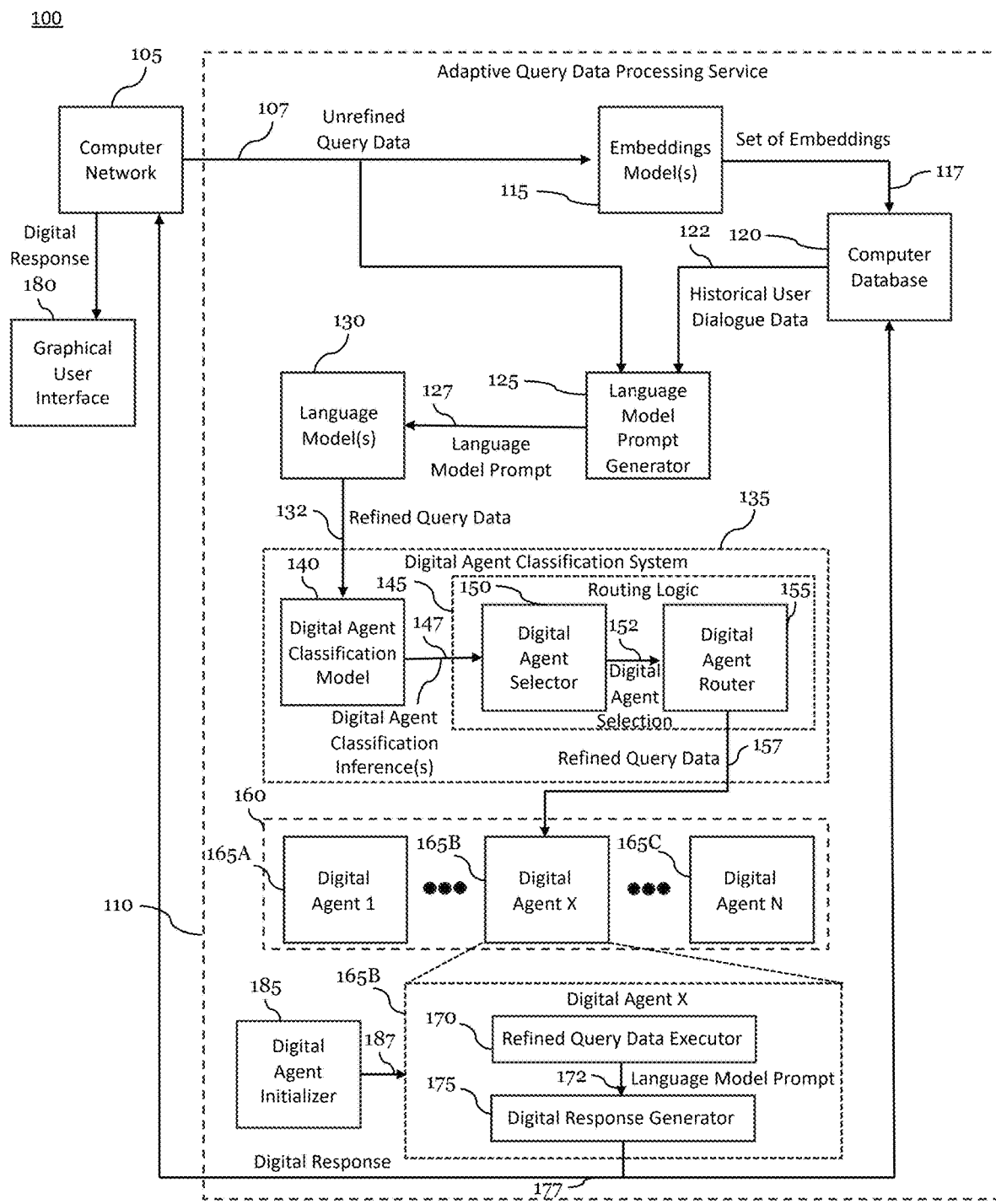
FIG. 1 illustrates a schematic representation of a system 100 in accordance with one or more embodiments of the present application.

As shown in FIG. 1, an adaptive query data processing service 110 may include embedding model(s) 115, a computer database 120, a language model prompt generator 125, language model(s) 130, digital agent classification system 135, digital agent set 160, and digital agent initializer 185.

The digital agent classification system 135 may include digital agent classification model 140 and routing logic 145, where routing logic 145 may correspond to functionalities of digital agent selector 150 and digital agent router 155. The digital agent set 160 may include N digital agents, including digital agents 165A, 165B, and 165C. Each digital agent of the digital agent set 160 may include a respective refined query data executor 170 and a digital response generator 175. Adaptive query data processing service 110 may be operably controlled to communicate with compute network 105 and graphical user interface 180. Each of the components of adaptive query data processing service 110 may be referred to as "modules", "components", or "elements" without deviating from the scope of the present disclosure.

In some examples, each of at least a portion of the components of adaptive query data processing service 110 may be executed by a respective set of computers within a distributed network of computers (e.g., a cloud-based system). Additionally, or alternatively, each of at least a portion of the components of adaptive query data processing service 110 may be located on a single controller or may be located on any combination of multiple controllers configured to communicate with each other. In some examples, the graphical user interface (GUI) 180 may be located on a display device separate from but in communication with the adaptive query data processing service 110.

In some examples, adaptive query data processing service 110 may be a cloud-based application that is hosted on one or more remote servers accessible via the graphical user interface 180. In such examples, the user interface 180 may interact with the adaptive query data processing service 110 using one or more network protocols (e.g., a Wireless Fidelity (Wi-Fi) protocol). The adaptive query data processing service 110 may provide the user interface 180 to a user upon establishment of an initial connection with the adaptive query data processing service 110 using the one or more network protocols. Accordingly, is shall be recognized that the modules of the adaptive query data processing service 110 may be executed by the one or more network of computers or servers, which may specifically programmed or encoded to perform the several operations for generating a digital response to unrefined query data.

1.15 Embedding Model(s)

One or more computers executing embeddings model(s) 115 may function to receive, via computer network 105, unrefined query data including textual data and to convert the unrefined query data to a set of embeddings of the unrefined query data. Additionally, the one or more computers executing embeddings model(s) 115 may function to provide the set of embeddings to one or more computers executing computer database 120.

An embeddings model as described herein may refer to a machine learning model that maps textual data (e.g., a string of words) to a point within a vector space (e.g., a vector). Textual data that are more similar semantically may map to points within the vector space that have a shorter vector distance. Accordingly, the use of embeddings models to map textual data to vectors may enable similarity comparisons via comparison of distances between vectors. Examples of embeddings models may include, but not be limited to Word2Vec, BERT, and fastText.

1.20 Computer Database

One or more computers executing computer database 120 may function to use the set of embeddings received from the one or more computers executing embedding model(s) 115 to perform a search of the computer database 120 storing historical user dialogue data. The one or more computers executing computer database 120 may transmit the historical user dialogue data to one or more computers executing language model prompt generator 125.

A computer database may refer to an organized collection of data. In the present disclosure, the computer database may be a vector database, which may be a database that stores vectors. In some examples, vector databases may use indexing techniques such as Approximate Nearest Neighbor (ANN) to enable vectors similar to a target vector to be found without performing an exhaustive search of the database. The computer database of the present disclosure may store embeddings of historical user dialogue data and/or the textual content of the historical user dialogue data.

1.25 Language Model Prompt Generator

One or more computers executing language model prompt generator 125 may function to receive, via computer network 105, the unrefined query data and to receive, from one or more computers executing computer database 120, the historical user dialogue data. Additionally, the one or more computers executing language model prompt generator 125 may automatically generate a language model prompt based on a combination of the unrefined query data and given historical user dialogue data returned as a result of performing the search. The one or more computers executing language model prompt generator 125 may transmit, to one or more computers executing language model(s) 130, the generated language model prompt.

1.30 Language Model(s)

One or more computers executing language model(s) 130 may function to receive, from the one or more computers executing language model prompt generator 125, the language model prompt and may transform, by the language model(s) 130, the unrefined query data to refined query data based on an input of the language model prompt to the language model(s) 130. The refined query data may include improved query data that is restructured from the unrefined data to enable an accurate processing by a downstream digital agent classification system.

A language model as described herein may refer to a machine learning model configured to process textual data representing a language. For instance, a language model may be configured to predict one or more textual outputs from a given input sequence. For instance, in the present application, a machine learning model may be configured to predict refined query data from a language model prompt including unrefined query data and/or historical user dialogue data. The language model may be trained on corpus of textual data (e.g., a corpus of textual data including examples of refined query data and the corresponding unrefined query data and/or historical user dialogue data).

1.35 Digital Agent Classification System

One or more computers executing digital agent classification system 135 may function to receive the refined query data generated by the one or more computers executing language model(s) 130 and to route the refined query data to an intended digital agent of the digital agent set 160.

1.40 Digital Agent Classification Model

One or more computers executing digital agent classification model 140 may function to receive the refined query data generated by the one or more computers executing language model(s) 130 and to generate at least one digital agent classification inference based on an input of embeddings of the refined query data. The one or more computers executing digital agent classification model 140 may function to transmit the at least one digital agent classification inference to one or more computers executing routing logic 145. Additionally, or alternatively, the one or more computers executing digital agent classification model 140 may apply agent selection logic to the at least one digital agent classification inference to generate a digital agent indication and may transmit the digital agent indication to one or more computers executing routing logic 145.

It should be noted that, to enable selection of a digital agent from at least one digital agent classification inference, the digital agent classification model 140 may function to implement any suitable machine learning model or any suitable ensemble of machine learning models. The one or more ensembles of machine learning models implemented by the system 100 may employ any suitable type of machine learning including one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), adversarial learning, and any other suitable learning style. Each module of the plurality can implement one or more of: a machine learning classifier, computer vision model, convolutional neural network (e.g., ResNet), visual transformer model (e.g., ViT), object detection model (e.g., R-CNN, YOLO, etc.), regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a semantic image segmentation model, an image instance segmentation model, a panoptic segmentation model, a keypoint detection model, a person segmentation model, an image captioning model, a 3D reconstruction model, a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, density-based spatial clustering of applications with noise (DBSCAN), expectation maximization, etc.), a bidirectional encoder representation from transformers (BERT) for masked language model tasks and next sentence prediction tasks and the like, variations of BERT (i.e., ULMFIT, XLM UDify, MT-DNN, SpanBERT, ROBERTa, XLNet, ERNIE, KnowBERT, VideoBERT, ERNIE BERT-wwm, MobileBERT, TinyBERT, GPT, GPT-2, GPT-3, GPT-4 (and all subsequent iterations), ELMo, content2Vec, and the like), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial lest squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and any suitable form of machine learning algorithm. Each processing portion of the system 100 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the system 100. Further, any suitable model (e.g., machine learning, non-machine learning, etc.) may be implemented in the various systems and/or methods described herein 1.45 Routing Logic One or more computers executing routing logic 145 may function to receive, from the one or more computers executing digital agent classification model 140, the digital agent indication and may route the refined query data to indicated digital agent. Additionally, or alternatively, the one or more computers executing routing logic 145 may function receive, from the one or more computers executing digital agent classification model 140, the at least one digital agent classification inference, may apply agent selection logic to the at least one digital agent classification inference to generate a digital agent indication and may route the refined query data to the indicated digital agent.

1.50 Digital Agent Selector

One or more computers executing digital agent selector 150 may function, via routing logic 145, to select or identify a distinct digital agent of a set of digital agents for processing the refined query data of the adaptive query data processing service 110. For instance, the one or more computers executing digital agent selector 150 may identify, from the digital agent indication, which digital agent of the digital agent set 160 to select and may provide an indication of the selected digital agent to the one or more computers executing digital agent router 155. Alternatively, the one or more computers executing digital agent selector 150 may apply agent selection logic to at least one digital agent classification inference generated by the one or more computers executing digital agent classification model 140 to determine the digital agent to select and provide the indication of the selected digital agent to the one or more computers executing digital agent router 155.

1.55 Digital Agent Router

The one or more computers executing digital agent router 155 may function to automatically route the refined query data to the distinct digital agent indicated by the digital agent selection received from the one or more computers executing digital agent selector 150.

1.60 Digital Agents

The one or more respective computers executing each digital agent of digital agent set 160 may function to execute accuracy-enhanced processing of the refined query data. The one or more respective computers may receive the refined query data routed by the one or more computers executing digital agent router 155 and may output a digital response to the unrefined query data after receiving the refined query data.

1.70 Refined Query Data Executor

The one or more computers executing refined query data executor 170 may function to execute the accuracy-enhanced processing of the refined query data. It should be noted that each digital agent of the digital agent set 165 may have a respective refined query data executor 170. The one or more computers executing refined query data executor 170 may function to receive the refined query data routed by the one or more computers executing digital agent router 155 and may transmit a result of the accuracy-enhanced processing (e.g., a language model prompt).

1.75 Digital Response Generator

The one or more computers executing digital response generator 175 may function to generate a digital response to the unrefined query data in response to the accuracy-enhanced processing. The one or more computers executing digital response generator 175 may receive a result of the accuracy-enhanced processing from refined query data executor 170 (e.g., a language model prompt) and may transmit the generated digital response. The generated digital response may be returned, via the computer network 105, to the GUI 180 (e.g., an interactive GUI in operable communication with the adaptive query data processing service 110).

1.85 Digital Agent Initializer

The one or more computers executing digital agent initializer 185 may function to automatically instantiate an instance of the distinct digital agent for executing an accuracy-enhanced processing of the refined query data.

Figure 2:
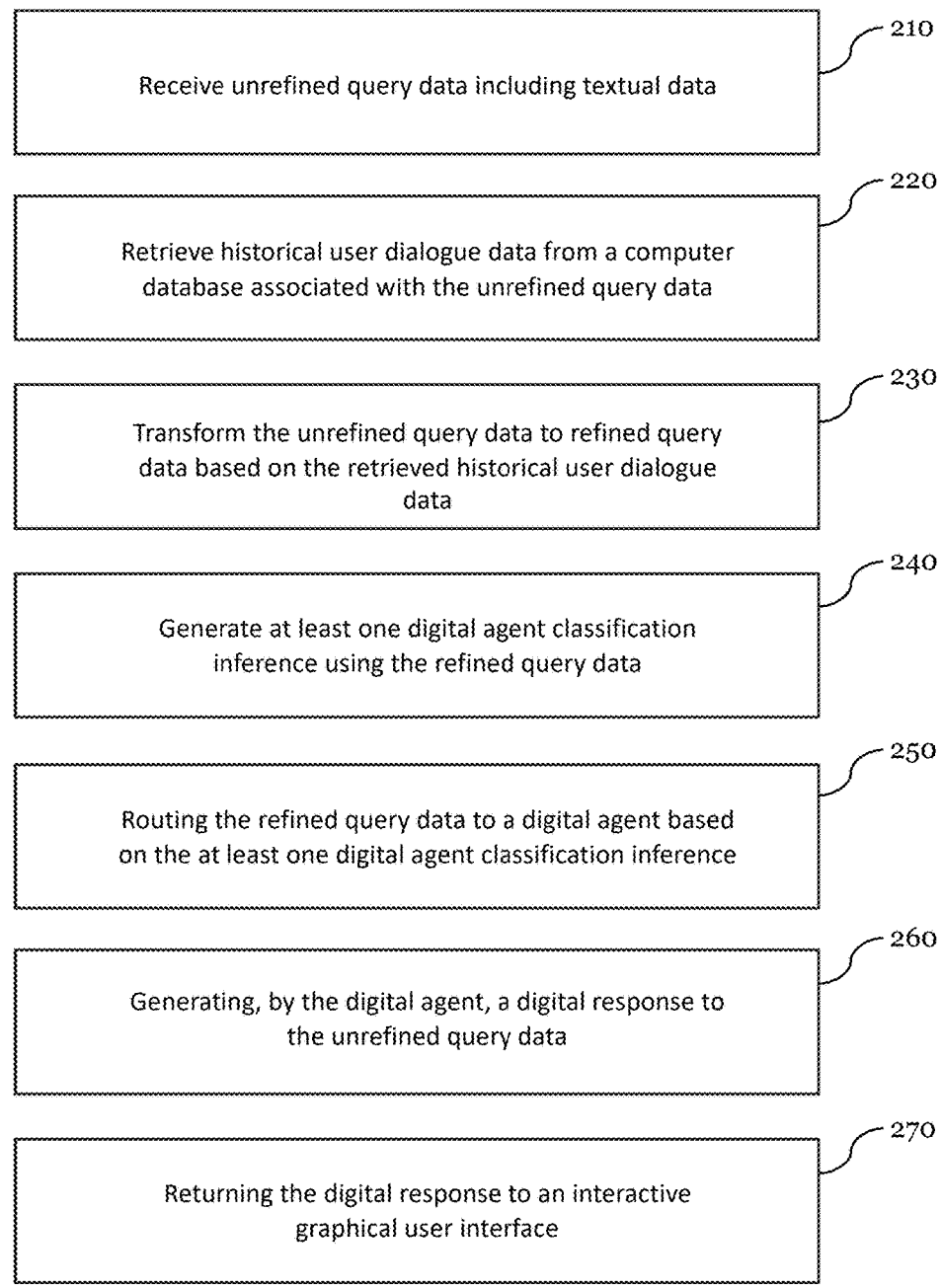
FIG. 2 illustrates an example method 200 in accordance with one or more embodiments of the present application.

2.00 Method for Accuracy-Enhanced Processing of Query Data within a Multi-Digital Agent Architecture As shown in FIG. 2, method 200 for implementing accuracy-enhanced processing of query data within a multi-digital agent architecture may include, at an adaptive query data processing service implemented by a network of distributed computers, receiving unrefined query data including textual data; retrieving historical user dialogue data from a computer database associated with the unrefined query data; transforming the unrefined query data to refined query data based on the retrieved historical user dialogue data; generating at least one digital agent classification inference using the refined query data; routing the refined query data to a digital agent based on the at least one digital agent classification interference; generating, by the digital agent, a digital response to the unrefined query data; and returning the digital response to an interactive GUI. It shall be appreciated that other examples contemplated within the scope of the present disclosure may involve more operations, fewer operations, different operations, or a different order of operations than as shown in FIG. 2.

The techniques described herein may have one or more advantages. For instance, the present disclosure may describe query data being forwarded to a digital agent to generate a response and/or to perform one or more tasks. Other techniques that have multiple digital agents configured to receive and process query data may forward the query to each of the multiple digital agents. Each of the multiple digital agents may process the query data (e.g., with a respective one or more processors) and may provide a response, where the best response may be selected according to some metric. By contrast, the techniques described herein enable the selection of one digital agent for receiving query data. Performing processing using each of multiple digital agents may have increased energy consumption or be associated with a higher overall uptime as compared to performing the processing using a single digital agent. Additionally, performing processing using each of multiple digital agents may be associated with increased usage of computational resources and compared to performing processing using only a single digital agent.

Additionally, techniques that use each of multiple digital agents for receiving query data may have limited capacity for parallelization as compared to techniques that select a single digital agent. For instance, if each of multiple digital agents process query data concurrently, these digital agents may not be available for taking on other query data. However, if only a single digital agent is processing query data, the other digital agents of the multiple digital agents may be available for processing query data (e.g., query data from other users besides the one that sent the query data being processed by the single digital agent). Accordingly, the techniques described herein may enable parallelization of digital agents.

Additionally, the retrieving of the historical user dialogue data may be performed by converting the unrefined query data into a set of embeddings and comparing the set of embeddings against embeddings stored within the computer database. Filtering the historical user dialogue data to only the most semantically relevant entries within the computer database may reduce an overhead associated with later transforming the unrefined query data into the refined query data. Additionally, performing the comparison using embeddings may use fewer computational resources as compared to other techniques for retrieving user historical dialogue data from a computer database. Thus, overall, the techniques described herein for retrieving the historical user dialogue data may result in reduced backend latency (e.g., faster query response times) and improved system performance.

Additionally, each of the digital agents may have access to a specific set of data sources. Generating the digital response may include searching through these data sources in order to extract relevant contextual information. Limiting the set of data sources that each digital agent has access to may result in fewer data sources being searched when a particular digital agent is selected as compared to having a single digital agent that has access to all the data sources. Searching fewer data sources may reduce backend latency when generating the digital response and may, thus, result in faster query response times. Additionally, in some examples, searching the data sources may include converting the refined query data into a set of embeddings and comparing the set of embeddings against embeddings stored within each of the data sources. Performing the comparison using embeddings may use fewer computational resources as compared to other techniques for retrieving contextual data. Thus, the limiting of the set of data sources to particular digital agents and/or the searching using embeddings may result in improved system performance.

2.10 Receiving Unrefined Query Data

S210 includes receiving unrefined query data including textual data. The unrefined query data may be received via a computer network. The term "unrefined query data" may refer to data representing a query written in a human language in a format that is not bound by a strict, defined ruleset (e.g., not a structured query, such as a SQL query). The term "textual data" may refer to data that represents a string of words. The term "computer network" may refer to a system of interconnected computing devices configured to communicate with each other.

The unrefined query data being received via the computer network may, in some examples, be initiated via an input of a query into a user interface (e.g., a graphical user interface (GUI). The input may be provided by a user or may be automatically retrieved from a data source (e.g., memory, a computer database, via a call to an API). Once the query is input to the user interface, the computer hosting the user interface may encode the query within a signal as unrefined query data and may transmit the signal to the computer network. The computer network may route the unrefined query data to the adaptive query data processing service.

2.20 Retrieve Historical User Dialogue Data

S220 includes retrieving historical user dialogue data from a computer database associated with the unrefined query data. For instance, S220 may include converting, by one or more computers executing one or more embeddings models, the unrefined query data to a set of embeddings of the unrefined query data and using the set of embeddings to perform a search of a computer database storing historical user dialogue data. The term "historical user dialogue data" may refer to previous instances of unrefined query data that have been processed by the adaptive query data processing service and/or previous instances of digital responses generated in response to the previous instances of unrefined query data. The term "set of embeddings" or "embeddings" may refer to a vector representation of the unrefined query data.

To perform the converting, the adaptive query data processing service may tokenize the textual data within the unrefined query data, where tokenizing may refer to splitting the textual input into a set of tokens. After tokenizing the textual data, the adaptive query data processing service may convert the tokens of the textual data into embeddings using the one or more embeddings models. For instance, the adaptive query data processing service may provide the set of tokens as an input to the one or more embeddings models and may generate a set of embeddings via the one or more embeddings models.

Searching the Computer Database for Historical User Dialogue Data

Performing the search may include comparing the set of embeddings for the unrefined query data against embeddings stored within the computer database for historical user dialogue data. For instance, the adaptive query data processing service may compare the set of embeddings for the unrefined query data against each respective set of embeddings for a previously received instance of unrefined query data and/or a previously generated digital response to unrefined query data. In some examples, the adaptive query data processing service may retrieve, from the computer database, historical dialogue user data whose associated stored embeddings are within a predefined threshold vector distance of the set of embeddings of the unrefined data query (e.g., cosine similarity, Euclidean distance). Additionally, the historical user dialogue data may be limited according to a temporal threshold. For instance, only historical user dialogue data within a current session, within a threshold number of sessions of the current one, or that has a timestamp within a threshold time of a current timestamp may be retrieved from the computer database. It should be noted that there may be examples where all historical user dialogue data linked to a particular user is retrieved from the computer database, where the temporal and/or vector distance thresholds may then be applied to filter the retrieved historical user dialogue data. It should be noted that, in some examples, the adaptive query data processing service may filter out or refrain from retrieving historical user dialogue data with a user identifier and/or session identifier distinct from that included with the set of embeddings of the unrefined query data.

Figure 3:
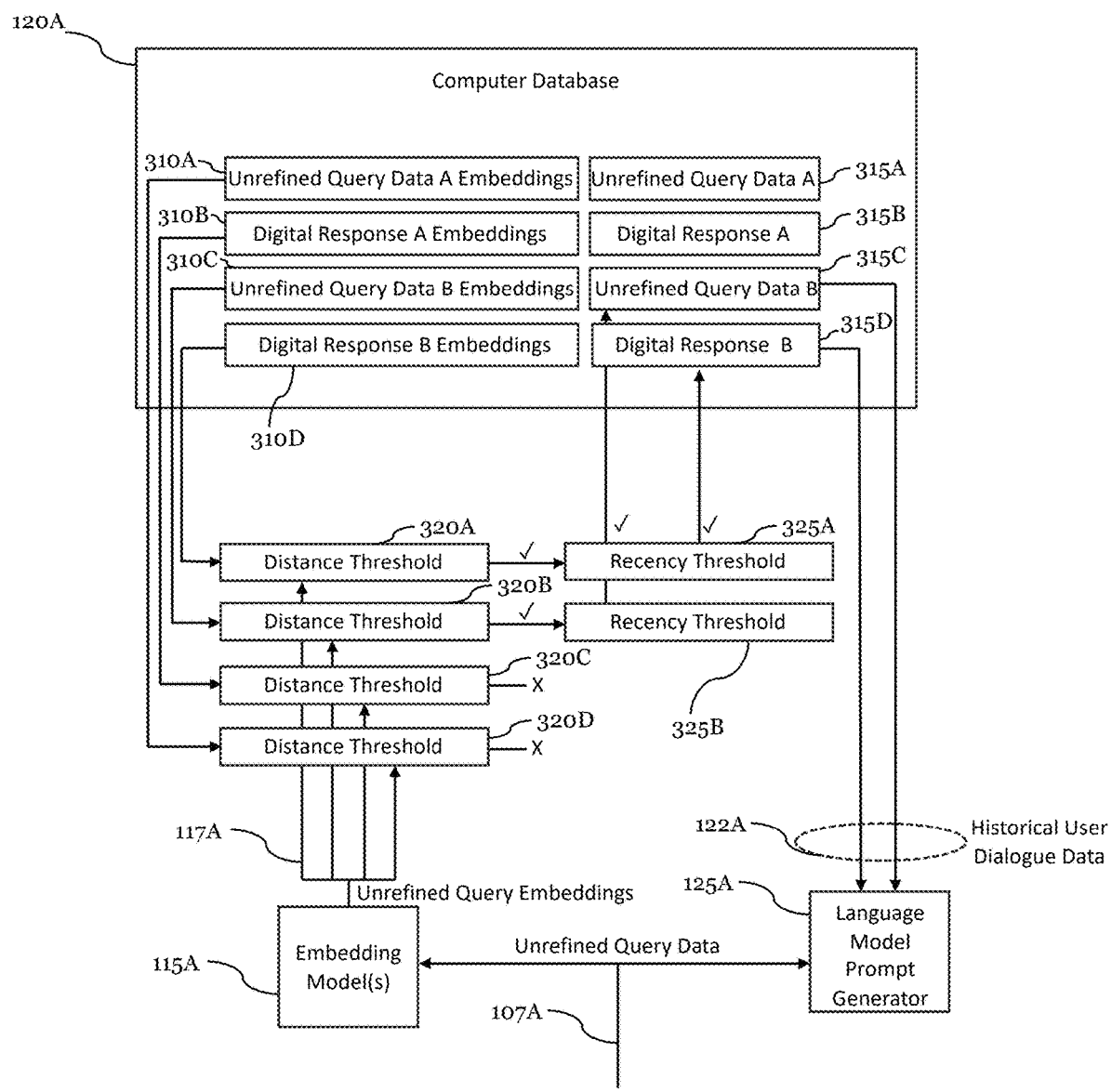
FIG. 3 illustrates an example historical user dialogue data search procedure 300 in accordance with one or more embodiments of the present application.

In a non-limiting example, as described with reference to FIG. 3, the adaptive query data processing service may receive unrefined query data 107A (e.g., via a computer network) and may be provided to embedding model(s) 115A. Embedding model(s) 115A may transform (e.g., convert) the unrefined query data 107A into unrefined query embeddings 117A (e.g., a set of embeddings). The adaptive query data processing service may retrieve from computer database 120A, embeddings 310A, 310B, 310C, and 310D each associated with historical user dialogue data. For instance embeddings 310A may represent a first instance of previously received unrefined query data 315A (i.e., Unrefined Query Data A); embeddings 310B may represent a digital response 315B to the first instance of previously received unrefined query data 315A (i.e., Digital Response A); embeddings 310C may represent a second instance of previously received unrefined query data 315C (i.e., Unrefined Query Data B); and embeddings 310D may represent a digital response 315D to the second instance of previously received unrefined query data 315C (i.e., Digital Response B). It should be noted that while embeddings 310A, 310B, 310C, and 310D are being contemplated for the present example, that fewer or greater instances of historical user dialogue data may be considered without deviating from the scope of the present disclosure.

The adaptive query data processing service may determine a respective vector distance between the unrefined query embeddings 117A and each of embeddings 310A, 310B, 310C, and 310D. The adaptive query data processing service may then compare each respective vector distance against a distance threshold. For instance, the adaptive query data processing service may determine that the vector distance between unrefined query embeddings 117A and embeddings 310D satisfies the distance threshold; that the vector distance between unrefined query embeddings 117A and embeddings 310C satisfies the distance threshold; that the vector distance between unrefined query embeddings 117A and embeddings 310B fails to satisfy the distance threshold; and that the vector distance between unrefined query embeddings 117A and embeddings 310A fails to satisfy the distance threshold. Accordingly, the adaptive query data processing service may retain embeddings 320C and 320D for further processing and may discard embeddings 320A and 320B.

The adaptive query data processing service may determine whether embeddings 320C and 320D each meet a temporal threshold, which may also be referred to as a recency threshold. For instance, the adaptive query data processing service may determine that embeddings 320C satisfies recency threshold 325B and that embeddings 320D satisfies recency threshold 325A. Accordingly, the adaptive query data processing service may retrieve unrefined query data 315C (i.e., Unrefined Query Data B) and digital response 315D (i.e., Digital Response B) from computer database 120A. Additionally, the adaptive query data processing service may refrain from retrieving unrefined query data 315A and digital response 315B, as their associated embeddings failed to satisfy the distance threshold. Accordingly, the historical user dialogue data 122A returned from computer database 120A may include unrefined query data 315C and digital response 315D and may not include unrefined query data 315A and digital response 315B. The adaptive query data processing service may provide the historical user dialogue data 122A and the originally received unrefined query data 107A to language model prompt generator 125A.

It should be noted that at least some of the aspects of FIG. 3 may be examples of aspects as described with reference to FIG. 1. For instance, unrefined query data 107A may be an example of unrefined query data 107 as described with reference to FIG. 1; embedding model(s) 115A may be an example of embedding model(s) 115 as described with reference to FIG. 1; unrefined query embeddings 117A may be an example of unrefined query embeddings 117 as described with reference to FIG. 1; computer database 120A may be an example of a computer database 120 as described with reference to FIG. 1; historical user dialogue data 122A may be an example of historical user dialogue data 122 as described with reference to FIG. 1; and language model prompt generator 125A may be an example of a language model prompt generator 125 as described with reference to FIG. 1.

Updating the Computer Database with New User Dialogue Data

In some examples, the adaptive query data processing service may update the computer database with new user dialogue data. For instance, as instances of unrefined query data are received via the computer network, the adaptive query data processing service may convert the instances of unrefined query data to respective sets of embeddings and may store the sets of embeddings and their corresponding instances of unrefined query data in the computer database. In some examples, the storing of an instance of unrefined query data and its corresponding set of embeddings may occur immediately after a search is performed for historical user dialogue data using the corresponding set of embeddings. Once an instance of unrefined query data and its corresponding set of embeddings are added to the computer database, the instance of unrefined query data may become eligible for inclusion in historical user dialogue data for future searches.

Additionally, once the adaptive query data processing service generates a digital response for an instance of unrefined query data, the adaptive query data processing service may convert the digital response to a set of embeddings and may store the digital response and the corresponding set of embeddings at the computer database. Once the digital response and its corresponding set of embeddings is stored at the computer database, the digital response may become eligible for inclusion in historical user dialogue data for future searches.

Figure 7:
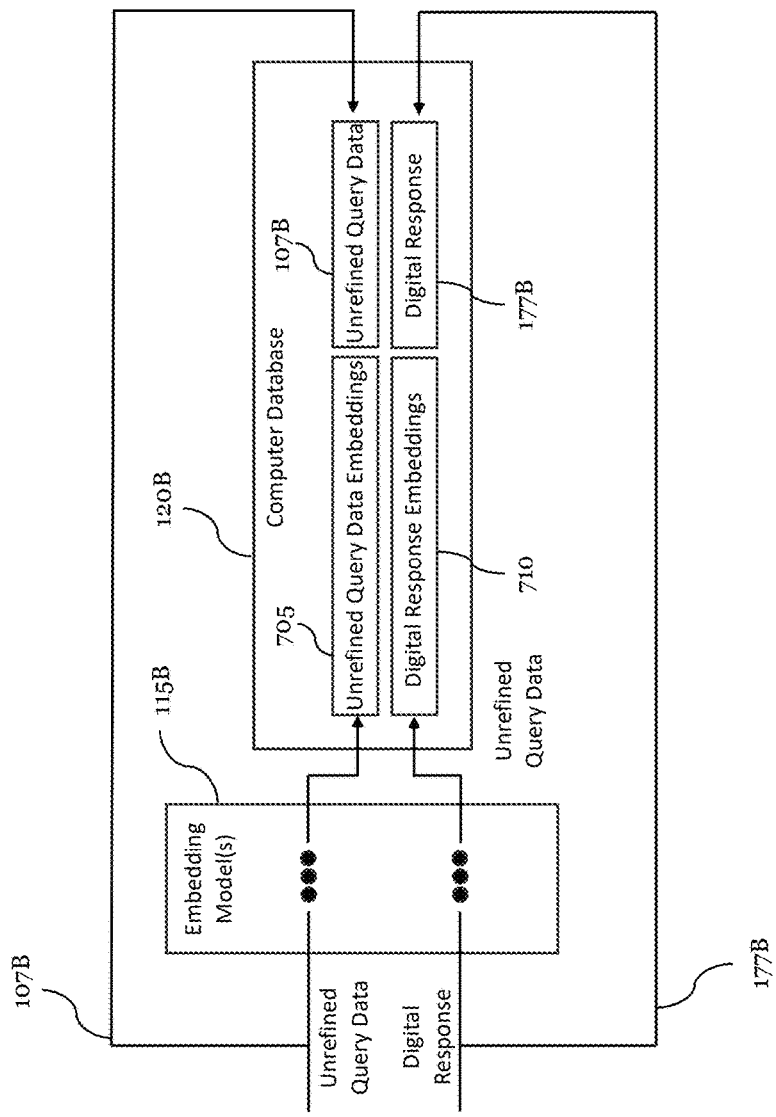
FIG. 7 illustrates an example historical user dialogue data storage procedure 700 in accordance with one or more embodiments of the present application.

In a non-limiting example, as depicted in FIG. 7, adaptive query data processing service may receive unrefined query data 107B (e.g., via a computer network). The adaptive query data processing service may provide the unrefined query data 107B to embedding model(s) 115B and may use embedding model(s) 115B to transform unrefined query data 107B to unrefined query data embeddings 705. The adaptive query data processing service may store the unrefined query data embeddings 705 and unrefined query data 107B at computer database 120B.

Similarly, as depicted in FIG. 7, adaptive query data processing service may receive digital response 177B (e.g., from a digital agent). The adaptive query data processing service may provide the digital response 177B to embedding model(s) 115B and may use embedding model(s) 115B to transform digital response 177B to digital response embeddings 170. The adaptive query data processing service may store the digital response embeddings 710 and digital response 177B at computer database 120B.

It should be noted that aspects of FIG. 7 may be related to one or more aspects of FIGS. 1 and/or FIG. 7. For instance, unrefined query data 107B may be an example of unrefined query data 107 as described with reference to FIG. 1; embedding model(s) 115B may be an example of embedding model(s) 115 as described with reference to FIG. 1; computer database 120B may be an example of computer database 120 as described with reference to FIG. 1; and digital response 177B may be an example of digital response 177 as described with reference to FIG. 1. Additionally, or alternatively, embeddings 310A and 310C of FIG. 3 may each be an example of unrefined query data embeddings 705 stored according to the techniques of FIG. 7; embeddings 310B and 310D of FIG. 3 may each be an example of digital response embeddings 710 stored according to the techniques of FIG. 7; unrefined query data 315A and 315C may each be an example of unrefined query data 107B stored according to the techniques of FIG. 7; and digital responses 315B and 315D. may each be an example of digital responses 177B stored according to the techniques of FIG. 7.

2.30 Transform the Unrefined Query Data to Refined Query Data

S230 includes transforming the unrefined query data to refined query data based on the retrieved historical dialogue data. For instance, S230 may include automatically generating, by the one or more computers, a language model prompt based on a combination of the unrefined query data and given historical user dialogue data returned as a result of performing the search. Additionally, S230 may include transforming, by one or more language models, the unrefined query data to refined query data based on an input of the language model prompt to the one or more language models. The term "refined query data" may refer to query data restructured from unrefined query data via processing of the unrefined query data through one or more language models.

Generating the language model prompt may include constructing a prompt that includes each token of the unrefined query data and each token of the historical user dialogue data. Alternatively, there may be examples in which the language model prompt only includes tokens of the unrefined query data (e.g., in examples in which a search of the computer database fails to yield historical user dialogue data or in which no search is performed). Constructing the prompt may include retrieving, from memory, a template or code configured to generate a template, where the template includes placeholders for one or more of the unrefined query data and historical user dialogue data. Additionally, constructing the prompt may include generating the prompt according to the template, where the placeholders are filled with the actual for the one or more of the unrefined query data and the historical user dialogue data. In some examples, the prompt may include a textual indication of which portion of the prompt corresponds to the unrefined query data and which (if present) portion of the prompt corresponds to the historical user dialogue data. Additionally, or alternatively, the prompt may include examples of unrefined query data and historical user dialogue data as well as the corresponding expected refined query data.

Use of Language Model(s) for Refining Query Data

Transforming the unrefined query data to refined query data may include providing, by the adaptive query data processing service, the language model prompt to the one or more language models and processing the language model prompt via the one or more language models to generate the refined query data. In some examples, the refined query data may include improved query data that is restricted from the unrefined query data to enable an accurate processing by a downstream digital agent classification system.

To enable the generation of this improved query data, the language models may generate the refined query data via token injection. Token injection may be a process in which new tokens are injected into (e.g., interleaved with) the original tokens of the unrefined query data to produce the refined query data. Additionally, in some examples, token injection may include replacing a portion of the tokens of the unrefined query data with new tokens while leaving other tokens untouched. The new tokens may be taken from the historical user dialogue data or may be generated separately.

In some examples, the injected tokens may be agent-indicative tokens, which may be tokens that have a strong association with a particular digital agent. Agent-indicative tokens having a strong association with a particular digital agent may refer to these tokens activating, in a predictive layer of a digital agent classification model of a downstream digital agent classification system, an increased number of weights for one digital agent while increasing few or no weights for other digital agents. This proportional increase in the number of weights activated for one digital agent may enable improved classification accuracy by increasing a probability that the digital agent classification model successfully classifies the refined query data to the one digital agent.

Figure 4A:
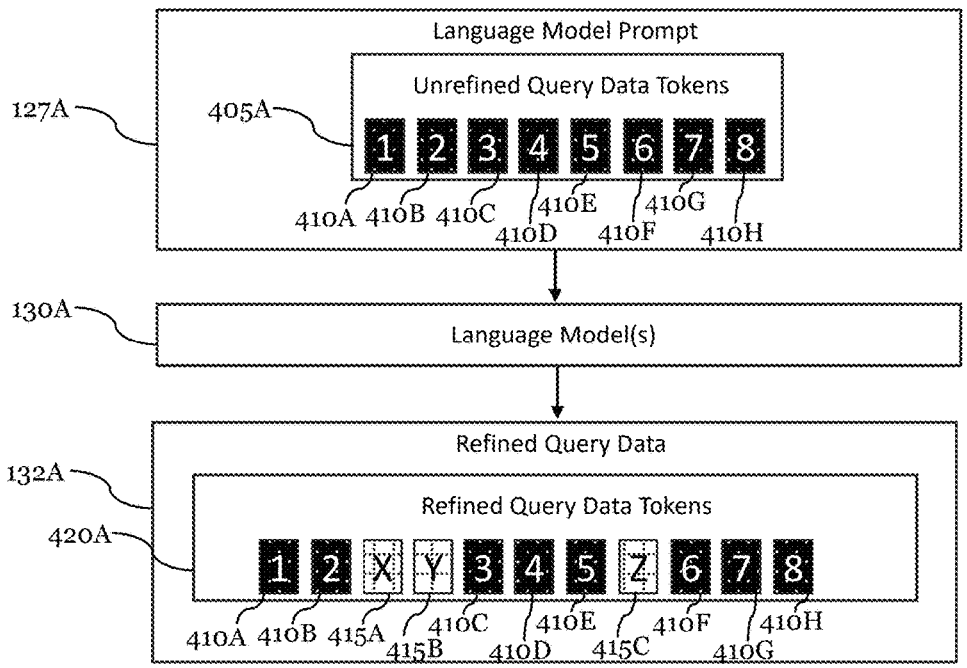
FIGS. 4A and 4B illustrate examples of token interjection procedures 400A and 400B in accordance with one or more embodiments of the present application.

In a first non-limiting example of token injection, as depicted in FIG. 4A, a language model prompt 127A may include an unrefined query data token sequence 405A, where the unrefined query data token sequence 405A may include each token of the textual data of unrefined query data. The unrefined query data token sequence 405A may include, in order, tokens 410A, 410B, 410C, 410D, 410E, 410F, 410G, and 410H. After the language model prompt 127A is fed to language model(s) 130A, the language model(s) 130A may output refined query data 132A, where refined query data 132A may include a refined query data token sequence 420A. The refined query data token sequence 420A may include at least a portion of the tokens of unrefined query data token sequence 405A. For instance, in the present example, refined query data token sequence 420A may include each of tokens 410A, 410B, 410C, 410D, 410E, 410F, 410G, and 410H. Refined query data token sequence 420A may further include agent-indicative tokens injected in between tokens of the unrefined query data token sequence 405A. For instance, agent-indicative tokens 415A and 415B may be injected between tokens 410B and 410C and agent-indicative token 415C may be injected between tokens 410E and 410F.

It should be noted that there may be examples where agent-indicative tokens may replace a token of the unrefined query data token sequence 405A (e.g., token 410A being replaced by an agent-indicative token). Additionally, or alternatively, there may be examples where a token of the unrefined query data token sequence 405A is removed by the language models 130A such that it does not appear in the refined query data token sequence 420A. Additionally, or alternatively, there may be examples where the ordering of at least some tokens of the unrefined query data token sequence 405A may swap (e.g., tokens 410F and 410G may swap positions).

Figure 4B:
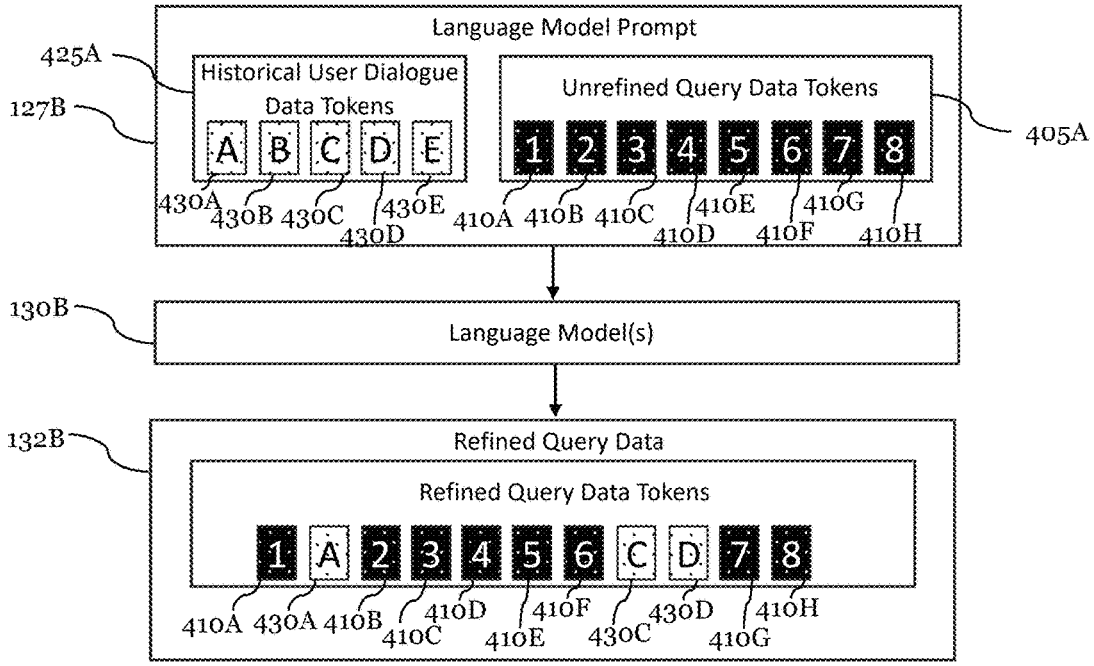

In a second non-limiting example of token injection, as depicted in FIG. 4B, a language model prompt 425A may include the unrefined query data token sequence 405A and a historical user dialogue data token sequence 425A (e.g., tokens derived from retrieved historical user dialogue data). The historical user dialogue data token sequence 425A may include, in order, tokens 430A, 430B, 430C, 430D, and 430E. After the language model prompt 127B is fed into language model(s) 130B, the language model(s) 130B may output refined query data 132B, where refined query data 132B may include a refined query data token sequence 420B. The refined query data token sequence 420B may include at least a portion of the tokens of unrefined query data token sequence 405A. For instance, in the present example, refined query data token sequence 420B may include each of tokens 410A, 410B, 410C, 410D, 410E, 410F, 410G, and 410H. Refined query data token sequence 420A may further include tokens of the historical user dialogue data token sequence 425A injected in between tokens of the unrefined query data token sequence 405A. For instance, token 430A may be injected between tokens 410A and 410B and tokens 430C and 430D may be injected between tokens 410F and 410G.

It should be noted that there may be examples where tokens of historical user dialogue token sequence 425A may replace a token of the unrefined query data token sequence 405A (e.g., token 410A being replaced by token 430A). Additionally, or alternatively, there may be examples where a token of the unrefined query data token sequence 405A is removed by the language models 130A such that it does not appear in the refined query data token sequence 420B. Additionally, or alternatively, there may be examples where the ordering of at least some tokens of the unrefined query data token sequence 405A may swap (e.g., tokens 410F and 410G may swap positions). Additionally, or alternatively, there may examples in which agent-indicative tokens distinct from the tokens of historical user dialogue data token sequence 425A may be injected into the unrefined query data token sequence 405A along with the tokens of historical user dialogue data token sequence 425A.

It should be noted that aspects of FIGS. 4A and 4B may have a relationship with aspects of FIG. 1. For instance, language model prompts 127A and 127B may each be an example of a language model prompt 127 as described with reference to FIG. 1; language models 130A and 130B may each be an example of language model(s) 130 as described with reference to FIG. 1; and refined query data 132A and 132B may each be an example of refined query data 132 as described with reference to FIG. 1.

It should be noted that other techniques for generating improved query data may be employed along with or instead of token injection. For instance, a language model may generate new tokens from those of the unrefined query data and historical user dialogue data that capture a similar semantic meaning (e.g., a rephrasing of the unrefined query data in view of the historical user dialogue data).

Training the Language Model(s) for Refining Query Data

The language model(s) used for transforming the unrefined query data to the refined query data may undergo a training procedure prior to receiving new unrefined query data from a user. The training procedure may include performing supervised learning on data samples received from a training dataset, where each data sample may indicate respective unrefined query data and/or historical user dialogue data and corresponding expected refined query data. For each data sample, the respective unrefined query data and/or historical user dialogue data may be used to construct a language model prompt fed to a language model, where the language model then generates candidate refined query data (e.g., actual refined query data). The expected refined query data for that data sample and the candidate refined query data may be compared and the comparison may be used to adjust weights of the language model (e.g., to fine-tune the language model).

In a non-limiting example, as described with reference to FIG. 8, the adaptive query data processing service may retrieve from memory 805, a data sample 810 from a training dataset stored at the memory 805. The adaptive query data processing service may parse the data sample 810 using data sample parser 815 to extract unrefined query data 820 and expected refined query data 825 from the data sample 810. The unrefined query data may be provided to language model prompt generator 125B, which may use the unrefined query data 820 to construct a language model prompt 127C. The adaptive query data processing service may then provide the language model prompt 127C to language model(s) 130D and may use language model(s) 130D to generate candidate refined query data 835 (e.g., actual refined query data) from the language model prompt 127C). The adaptive query data processing service may provide the candidate refined query data 835 and the expected refined query data 825 to training module 830.

Training module 830 may compare the expected refined query data 825 and the candidate refined query data 835. Comparing the expected refined query data 825 and the candidate refined query data 835 may include converting each of the expected refined query data 825 and the candidate refined query data 835 to a respective set of embeddings and determining a vector distance between the sets of embeddings. The training module 830 may use the results of the comparison to adjust weights of one or more predictive layer of language model(s) 130D. The adaptive query data processing service may repeat the process with additional data samples 810 to further adjust the weights of language model(s) 130D.

Figure 8:
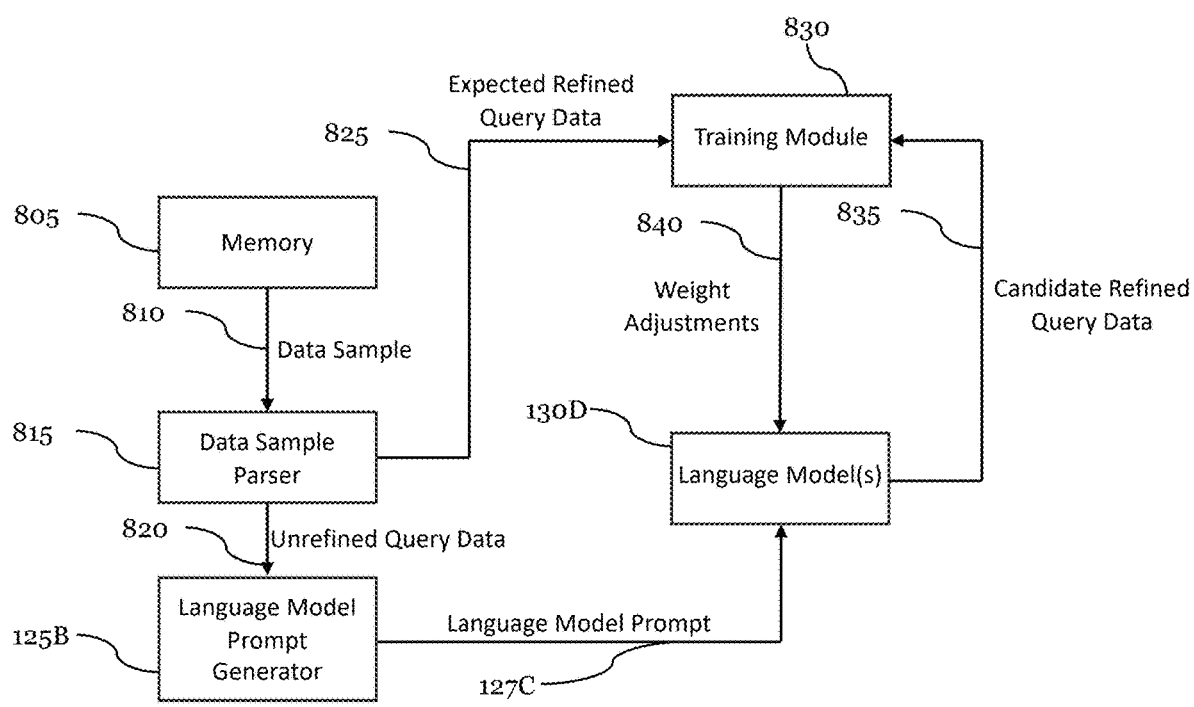
FIG. 8 illustrates an example refined query generation enhancement procedure 800 in accordance with one or more embodiments of the present application.

It should be noted that aspects of FIG. 8 may have a relationship with aspects of FIG. 1. For instance, language model prompt generator 125B may be an example of a language model prompt generator 125 as described with reference to FIG. 1; language model prompt 127C may be an example of a language model prompt 127C as described with reference to FIG. 1; and language model(s) 130D may be an example of language model(s) 130 as described with reference to FIG. 1.

It should be noted that there may be examples where each data sample of the training dataset includes a language model prompt and corresponding expected refined query data. The language model prompt for the data sample may include tokens of associated unrefined query data and/or historical user dialogue data. In examples in which each data sample include the language model prompt, the language model prompt may be provided directly to a language model to generate the candidate refined query data.

2.40 Generating at Least One Digital Agent Classification Inference

S240 includes generating at least one digital agent classification inference using the refined query data. For instance, S240 may include generating, by one or more computers executing a digital agent classification model of the digital agent classification system, at least one digital agent classification inference based on an input of embeddings of the refined query data. A "digital agent classification inference" may refer to an output of the digital agent classification model in response to receiving refined query data. The digital agent classification inference may take the form of a metric whose value indicates a level of similarity between the refined query data and a description of a particular digital agent. Alternatively, the digital agent classification inference may have a value (e.g., a vector value) that indicates the level of similarity between the refined query data and the respective description of each digital agent of a set of distinct digital agents.

In a non-limiting example, as described with reference to FIG. 5A, the adaptive query data processing service may retrieve from a memory 505, a textual description for each digital agent of a set of digital agents. For instance, the adaptive query data processing service may retrieve a first textual description 510A for a first digital agent; a second textual description 510B for a second digital agent; and a third textual description 510C for a third digital agent. The adaptive query data processing service may provide each of these textual descriptions to digital agent classification model 140A, which may process the textual descriptions (e.g., via language model(s) 515) and may store embeddings of the textual descriptions in a reference memory 520. For instance, the digital agent classification model may process textual description 510A and may store corresponding first embeddings 525A for the first digital agent at reference memory 520; may process textual description 510B and may store corresponding second embeddings 525B for the second digital agent at reference memory 520; and may store corresponding third embeddings 525C for the third digital agent at reference memory 520.

Figure 5A:
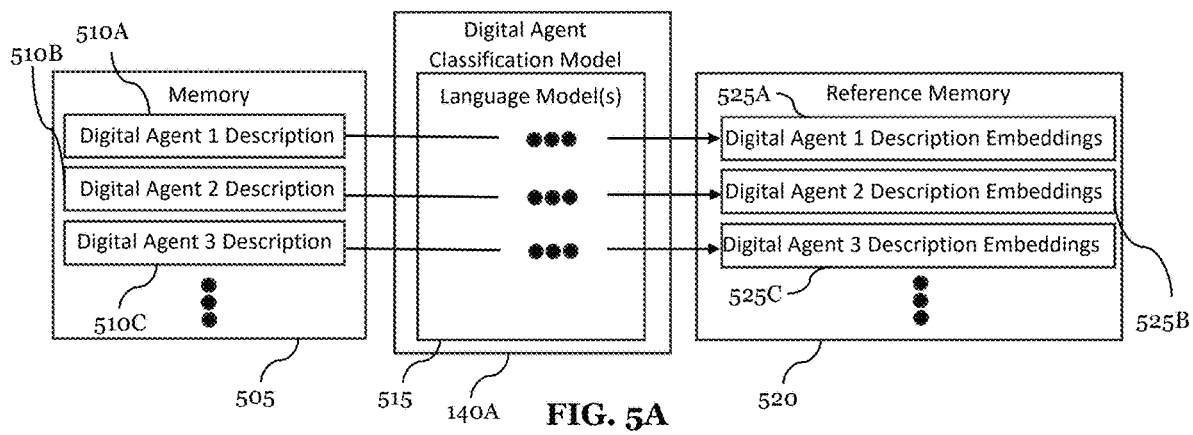
FIGS. 5A and 5B illustrate an example digital agent classification initialization procedure 500A and an example digital agent classification procedure 500B in accordance with one or more embodiments of the present application.
Figure 5B:
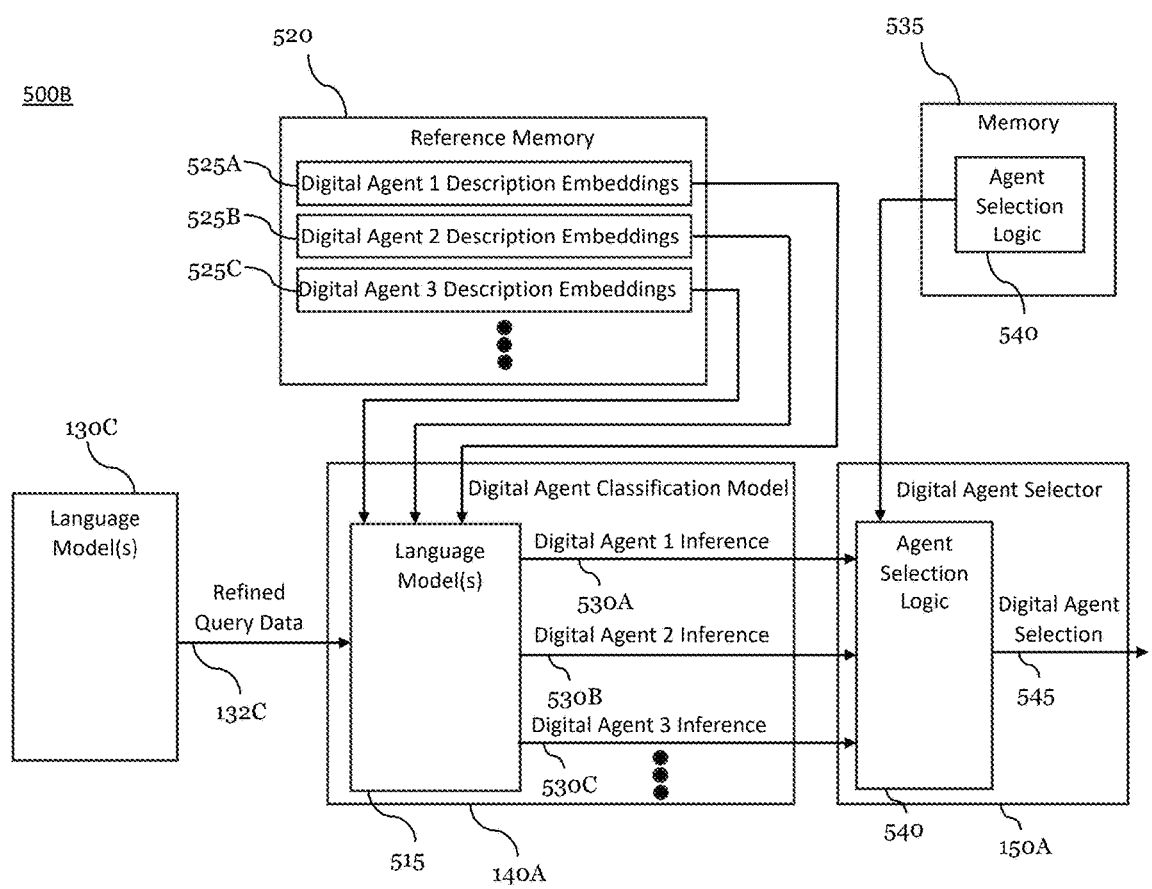

Additionally, as depicted in FIG. 5B, the adaptive query data processing service may use language model(s) 130C may transform unrefined query data to refined query data 132C and may provide the refined query data 132C to language model(s) 515 of digital agent classification model 140A. The adaptive query data processing service may extract each of the embeddings for the digital agents from reference memory 520 (e.g., embeddings 525A, 525B, and 525C) and may generate, for each of the digital agents, a respective digital agent classification inference using language model(s) 515. For instance, using language model(s) 515, the adaptive query data processing service may generate a first inference 530A for the first digital agent; a second inference 530B for the second digital agent; and a third inference 530C for the third digital agent. The adaptive query data processing service may provide each of the first inference 530A, the second inference 530B, and the third inference 530C to digital agent selector 150A. It should be noted that, in some examples, a single digital agent classification inference may be generated for all of the digital agents and the single digital agent classification inference may be provided to digital agent selector 150A.

It should be noted that aspects of FIGS. 5A and 5B may have a relationship with aspects of FIG. 1. For instance, language model(s) 130C may be an example of language model(s) 130 as described with reference to FIG. 1; refined query data 132C may be an example of refined query data 132 as described with reference to FIG. 1; digital agent classification model 140A may be an example of a digital agent classification model 140 as described with reference to FIG. 1; and digital agent selector 150A may be an example of a digital agent selector 150 as described with reference to FIG. 1.

2.50 Routing the Refined Query Data to a Digital Agent

S250 includes routing the refined query data to a digital agent based on the at least one digital agent classification inference. For instance, S250 may include automatically applying to the refined query data, by the one or more computers executing the digital agent classification system, digital routing logic. The digital routing logic, when applied, may automatically cause the one or more computers to select or identify a distinct digital agent of a plurality of digital agents for processing the refined query data of the adaptive query data processing service. Additionally, the digital routing logic, when applied, may automatically route the refined query data to the distinct digital agent of the set of digital agents of the adaptive query data processing service.

The term "digital routing logic" may, in some examples, refer to instructions that the one or more computers executing the digital agent classification system may execute to convert the at least one digital agent classification inference to a control signal to provide to the digital agent and to provide the control signal to the digital agent. Alternatively, the term "digital routing logic" may refer to dedicated hardware (e.g., a field-programmable gate array) configured to implement digital logic that converts the at least one digital agent classification inference to a control signal to provide to the digital agent and to provide the control signal to the digital agent. Alternatively, the term "digital routing logic" may refer to a set of parameters or heuristics that the one or more computers executing the digital agent classification system may access to assist in converting the at least one digital agent classification inference to a control signal to provide to the digital agent and to provide the control signal to the digital agent.

In a non-limiting example, as depicted in FIG. 5B, the adaptive query data processing service may retrieve agent selection logic encoded at a memory 535 accessible by the adaptive query data processing service and may apply the agent selection logic 540 at digital agent selector 150A to the at least one digital agent classification inference received from digital agent classification model 140A. For instance, the adaptive query data processing service may apply the agent selection logic 540 to a first inference 530A, a second inference 530B, and a third inference 530C and may output a digital agent selection 545. The digital agent selection 545 may include an explicit indication of a digital agent to which refined query data 132C is to be routed.

In some examples, agent selection logic 540 includes a set of agent selection parameters defining one or more agent selection threshold values or one or more agent selection value ranges that aid in selecting a digital agent using a digital agent classification inference. In other examples, the agent selection logic includes one or more agent selection heuristics defining a set of rules for selecting the digital agent using the digital agent classification inference. Alternatively, the agent selection may include executable instructions that the adaptive query data processing service may execute to automatically select the digital agent using the digital agent classification inference. In yet other examples, the agent selection logic 540 may include dedicated hardware (e.g., an FPGA) programmed in a configuration such that received digital agent classification inferences are converted to a digital agent selection 545. In still other examples, the agent selection logic 540 may be a classification head applied to an output of the language model(s) 140A to convert digital agent classification inferences to a digital agent selection 545.

Digital agent selector 150A may provide the digital agent selection 545 to a digital agent router (e.g., digital agent router 155) included in the digital routing logic. The digital agent router may convert the digital agent selection 545 to a control signal that the digital agent router provides to the selected digital agent. The digital agent router may perform the conversion using dedicated hardware (e.g., an FPGA) that automatically routes the control signal based on an input of the digital agent selection 545 to the dedicated hardware or may perform the conversion using software.

It should be noted that there may be examples where the inferences associated with each of the digital agents fail to meet a threshold for routing the refined query data 132C to a particular digital agent. In such examples, agent selection logic 540 may indicate a particular digital agent (i.e., a fallback digital agent, a default digital agent) to which refined query data 132C is to be routed. Alternatively, reference memory 520 may include embeddings, provided to language model(s) 515, associated with a description of a fallback or default digital agent that may increase a likelihood that refined query data whose textual data is ambiguously linked to a particular digital agent is routed to a particular digital agent.

2.60 Generating a Digital Response by the Digital Agent

S260 includes generating, by the digital agent, a digital response to the unrefined query data. For instance, S260 may automatically instantiate an instance of the distinct digital agent for executing an accuracy-enhanced processing of the refined query data and may execute the accuracy-enhanced processing of the refined query data by the one or more computers executing the distinct digital agent. Additionally, S260 may include, in response to the accuracy-enhanced processing, generating by the one or more computers executing the distinct digital agent a digital response to the unrefined query data.

The term "accuracy-enhanced processing" as it relates to refined query data may refer to a digital response generated by a digital agent being more factually accurate when using refined query data as compared to unrefined query data. For instance, generating the digital response may include searching one or more data sources for contextual data using embeddings of query data. The contextual data returned when using embeddings of refined query data may provide more relevant contextual data as compared to using embeddings of unrefined query data. Additionally, or alternatively, the term "accuracy-enhanced processing" as it relates to refined query data may refer to a digital response generated by a particular selected digital agent for a particular instance of refined query data being more factually accurate as compared to a digital response generated by another digital agent. For instance, each digital agent may be configured with a particular role or may have access to a distinct set of sources such that some digital agents may produce a more factually accurate response to a particular instance of refined query data as compared to others. Thus, the routing of refined query data to a most relevant digital agent may enable a generation of a more factually accurate response.

In some examples, a particular digital agent may have access to multiple data sources. Additionally, or alternatively, a particular data source may be accessible by multiple digital agents. In some examples, the connection of a particular digital agent to a particular data source may be statically configured or preconfigured. In other examples, the connection of the particular digital agent to the particular agent may be dynamically configured. For instance, the adaptive query data processing service may provide a signal to the digital agent indicating for the digital agent to establish a connection with an additional data source or to terminate a connection with a currently connected data source.

In some examples, each digital agent of the plurality of digital agents is implemented by at least one specially configured computer of the distributed network of computers that is encoded with unique logic for automatically executing one or more tasks based on a processing of the refined query. The at least one specially configured computer may include one or more dedicated processors for performing functions associated with digital agent and one or more dedicated memories that store the unique logic. In some examples, the at least one specially configured computer (e.g., the one or more dedicated processors of the at least one specially configured computer) is operably controlled by an instantiation signal from the one or more computers executing the digital agent classification system (e.g., a signal indicating that the digital agent associated with the at least on specially configured computer is the one being selected).

In a non-limiting example, as described with reference to FIG. 6, routing logic 145A may route the refined query data to digital agent 625, For instance, routing logic 145A may generate a control signal that indicates the refined query data 132D to digital agent 625 and/or may provide the control signal and a signal indicating the refined query data 132D separately. A language model prompt generator 615 of digital agent 625 may receive the refined query data 132D.

Additionally, the adaptive query data processing service may retrieve, from memory 605, a digital agent description 607 and a ruleset 608 for the digital agent 625 and may provide the digital agent description 607 and the ruleset 608 to digital agent 625. The digital agent description 607 may include textual data that defines a role or responsibility of the digital agent. The ruleset 608 may include textual data that defines a set of rules or constraints that the digital agent is to obey (e.g., a rule indicating that the digital agent is forbidden from making a particular statement). The language model prompt generator 615 may receive the digital agent description 607 and the ruleset 608.

Additionally, the adaptive query data processing service may retrieve from one or more data sources 610, contextual data 612 and may provide the contextual data 612 to the digital agent 625. In some examples, retrieving the contextual data 612 may include converting the refined query data to a set of embeddings and comparing the set of embeddings against embeddings associated with information stored at the one or more data sources 610. The adaptive query data processing service may determine which embeddings are within a threshold vector distance of the set of embeddings of the refined query data and may retrieve the information linked to those embeddings. The contextual data 612 may be an aggregate of this retrieved information. The language model prompt generator 615 may receive the contextual data 612.

Once the language model prompt generator 615 retrieves one or more of the refined query data 132D, the contextual data 612, the digital agent description 607, and the ruleset 608, the language model prompt generator 615 may use this information to construct a language model prompt 620 and may provide the language model prompt to language model(s) 625. The adaptive query data processing service may process the language model prompt 620 using the language model(s) 625 to generate a digital response 177A.

Figure 6:
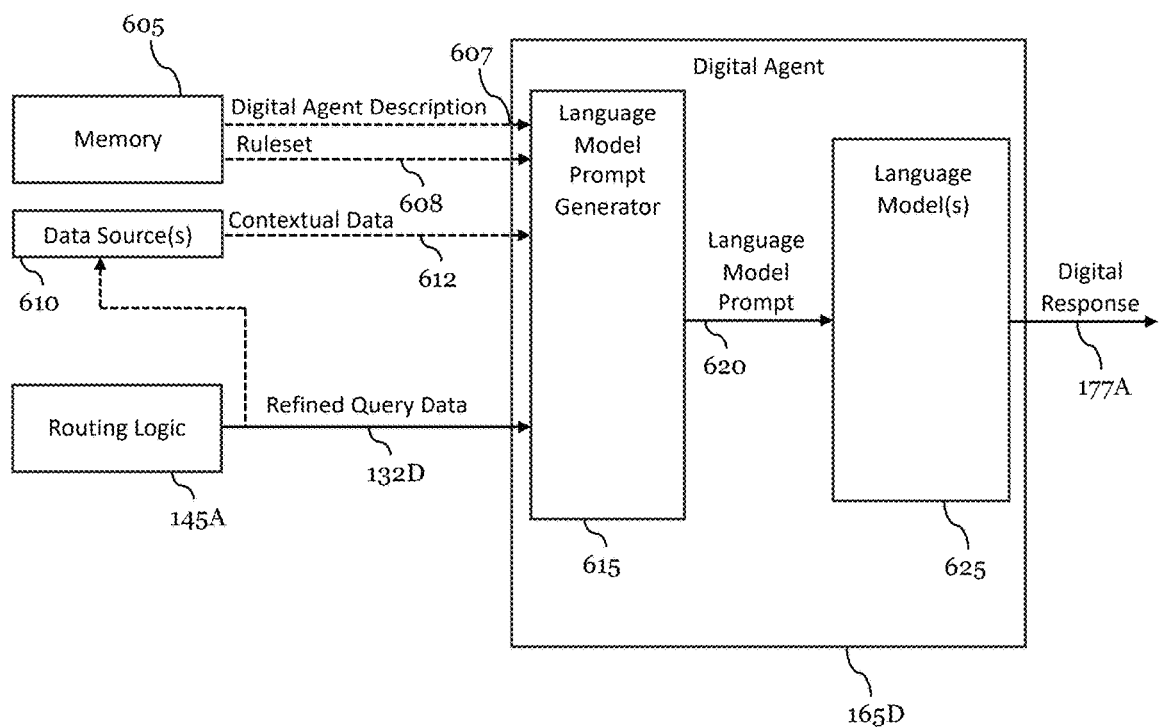
FIG. 6 illustrates an example digital agent response generation procedure 600 in accordance with one or more embodiments of the present application.

It should be noted that one or more aspects of FIG. 6 may have a relationship with one or more aspects of FIG. 1. For instance, routing logic 145A may be an example of routing logic 145 as described with reference to FIG. 1; digital agent 165D may be an example of digital agent 165B as described with reference to FIG. 1; language model prompt generator 615 may be an example of one or more functionalities of refined query data executor 170 as described with reference to FIG. 1; language model prompt 620 may be an example of a language model prompt 172 as described with reference to FIG. 1; language model(s) 625 may be an example of one or more functionalities of digital response generator 175 as described with reference to FIG. 1; and digital response 177A may be an example of a digital response 177 as described with reference to FIG. 1.

Digital Agent Tasks

In some examples, a digital agent may perform dedicated tasks upon receiving refined query data from a digital agent classification system. For instance, a first digital agent may be dedicated for generating a digital artifact (e.g., a report) using the refined query data. The first digital agent may further log the report and/or may provide the report to the user. Additionally, or alternatively, a second digital agent may be response for user account management using the received refined query data. For instance, the second digital agent may create an account, update an account, or delete an account based on which of these tasks the refined query data indicates to perform. The second digital agent may log a receipt of performing one of these tasks and may provide an indication to the user that the task has been performed. It should be noted that some or each of these tasks may be performed in real-time (e.g., may be initiated as soon as a respective digital agent receives the refined query data).

2.70 Returning the Digital Response to an Interactive GUI

S270 includes returning the digital response to an interactive graphical user interface. For instance, S260 may include returning, via the computer network, the digital response to an interactive GUI that is in operable communication with the adaptive query data processing service.

In some examples, returning the digital response may include encoding the digital response in a signal and transmitting the signal to the computer network, where the computer network may route the digital response to a computer hosting the GUI. The GUI may receive the digital response and may generate a signal at the computer to display the digital response to the user who provided the initial query. In some examples, the computer hosting the GUI may log the digital response (e.g., to a memory of the computer, to a computer database, via a call to an API).

3. Computer-Implemented Method and Computer Program Product

The system and methods of the preferred embodiment and variations thereof can be embodied and/or implemented at least in part as a machine configured to receive a computer-readable medium storing computer-readable instructions. The instructions are preferably executed by computer-executable components preferably integrated with the system and one or more portions of the processors and/or the controllers. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Although omitted for conciseness, the preferred embodiments include every combination and permutation of the implementations of the systems and methods described herein.

As a person skilled in the art will recognize from the previous detailed description and from the figures and claims, modifications and changes can be made to the preferred embodiments of the invention without departing from the scope of this invention defined in the following claims.

What is claimed is:

1. A computer-implemented method for an accuracy-enhanced processing of query data within a multi-digital agent architecture, the method comprising:
at an adaptive query data processing service that is implemented by a network of distributed computers:
receiving, via a computer network, unrefined query data comprising textual data;
converting, by one or more computers executing one or more embeddings models, the unrefined query data to a set of embeddings of the unrefined query data;
using the set of embeddings to perform a search of a computer database storing historical user dialogue data,
automatically generating, by the one or more computers, a language model prompt based on a combination of the unrefined query data and given historical user dialogue data returned as a result of performing the search;
transforming, by one or more language models, the unrefined query data to refined query data based on an input of the language model prompt to the one or more language models, wherein the refined query data comprises improved query data that is restructured from the unrefined query data to enable an accurate processing by a downstream digital agent classification system, generating, by one or more computers executing a digital agent classification model of the digital agent classification system, at least one digital agent classification inference based on an input of embeddings of the refined query data;

automatically applying to the refined query data, by the one or more computers executing the digital agent classification system, digital routing logic that, when applied:

automatically causes the one or more computers to select or identify a distinct digital agent of a plurality of digital agents for processing the refined query data of the adaptive query data processing service, and automatically routes the refined query data to the distinct digital agent of the plurality of digital agents of the adaptive query data processing service;

automatically instantiating an instance of the distinct digital agent for executing an accuracy-enhanced processing of the refined query data;

executing the accuracy-enhanced processing of, by the one or more computers executing the distinct digital agent, the refined query data; and in response to the accuracy-enhanced processing, generating by the one or more computers executing the distinct digital agent a digital response to the unrefined query data; and returning, via the computer network, the digital response to an interactive graphical user interface that is in operable communication with the adaptive query data processing service.

2. The computer-implemented method according to claim 1, wherein the digital agent classification system was initialized prior to generating the at least one digital agent classification inference, the initialization comprising:

retrieving from computer memory, for each digital agent of the plurality of agents, a respective agent textual description data;

generating a respective language model prompt for each respective agent textual description data;

converting, by the one or more computers executing the one or more language models, each respective agent textual description data into a respective set of embeddings based on an input of each language model prompt; and storing the respective set of embeddings for each digital agent at one or more reference memories accessible to the one or more language models associated with the digital agent classification system.

3. The computer-implemented method according to claim 2, further comprising:

retrieving, by the one or more computers executing the one or more language models of the digital agent classification system from the one or more memories, the respective set of embeddings for each digital agent, wherein generating the at least one digital agent classification inference comprises:

generating, by the one or more computers of the digital agent classification system, a respective digital agent classification inference for each digital agent based at least in part on the sets of embeddings retrieved for the digital agents and the embeddings of the refined query data; and applying, by the one or more computers of the digital agent classification system, agent selection logic to the digital agent classification inferences to output an indication of the digital agent associated with one of the digital agent classification inferences, wherein the refined query data is routed to the indicated digital agent.

4. The computer-implemented method according to claim 3, further comprising:

encoding the one or more memories accessible by the digital agent classification system with the agent selection logic, wherein applying the agent selection logic comprises:

retrieving, by the one or more computers of the digital agent classification system, the agent selection logic; and executing the agent selection logic by the one or more computers of the digital agent classification system to select or identify the distinct digital agent.

5. The computer-implemented method according to claim 4, wherein the agent selection logic comprises:

a set of agent selection parameters defining one or more agent selection threshold values or one or more agent selection value ranges that aid in selecting a digital agent using a digital agent classification inference, one or more agent selection heuristics defining a set of rules for selecting the digital agent using the digital agent classification inference, or executable instructions configured to automatically select the digital agent using the digital agent classification inference.

6. The computer-implemented method according to claim 2, further comprising:

retrieving, from the computer memory, given textual description data indicating one of the digital agents as a default fallback digital agent;

automatically generating a given language model prompt based on the retrieved textual description data;

converting, by the one or more computers executing the one or more language models, the given textual description data into a second set of embeddings based on an input of the given language model prompt; and storing the second set of embeddings for the default fallback digital agent at the one or more reference memories, wherein the stored second set of embeddings aids the adaptive query data processing service in routing the refined query to the fallback digital agent by increasing a probability that the agent classification model successfully classifies the refined query to the default fallback digital agent.

7. The computer-implemented method according to claim 1, wherein transforming the unrefined query data to refined query data comprises:

interjecting, into tokens of the unrefined query data, agent-indicative tokens, wherein the embeddings of the refined query data are generated from the tokens of the unrefined query data and the agent-indicative tokens.

8. The computer-implemented method according to claim 7, wherein:

the digital classification model comprises one or more predictive layers comprising a plurality of weights, and the agent-indicative tokens, when included in the refined query data, enable improved classification accuracy in the digital agent classification by increasing a quantity of the plurality of weights that are activated for the distinct digital agent, thus increasing a probability that the digital agent classification model successfully classifies the refined query data to the distinct digital agent.

9. The computer-implemented method according to claim 7, wherein the agent-indicative tokens are derived from embeddings of the historical user dialogue data.

10. The computer-implemented method according to claim 1, further comprising:
retrieving, from computer memory, one or more data samples, each data sample comprising respective unrefined query data and labeled with respective expected refined query data;
transforming, by the one or more language models for each data sample, the respective unrefined query data into candidate refined query data;
adjusting one or more weights of the one or more language models based at least in part on the respective candidate query data and the respective expected refined query for each data sample of the one or more data samples.

11. The computer-implemented method according to claim 1, further comprising:
converting, by one or more computers executing the one or more embeddings models, the digital response to a second set of embeddings of the digital response; and
storing the set of embeddings of the unrefined query data and the second set of embeddings of the digital response at the computer database.

12. The computer-implemented method according to claim 11, further comprising:
receiving, via the computer network, second unrefined query data comprising additional textual data;
converting, by one or more computers executing the one or more embeddings models, the second unrefined query data to a third set of embeddings of the second unrefined query data;
using the set of embeddings to perform a search of the computer database storing second historical user dialogue data, the second historical user dialogue data comprising one or more of the unrefined query data or the digital response.

13. The computer-implemented method according to claim 1, further comprising:
extracting, from one or more data sources associated with the distinct digital agent, contextual data for the distinct digital agent;
automatically generating, by the one or more computers, a second language model prompt based on a combination of the refined query data and the contextual data; and
outputting, by the one or more language models, the digital response based at least in part on a provision of the second language model prompt to the one or more language models.

14. The computer-implemented method according to claim 13, wherein automatically generating the second language model prompt comprises:
generating the second language model prompt based on a combination of the refined query data, the contextual data, a first textual description of the distinct digital agent, and a second textual description indicating a set of rules for the distinct digital agent to follow.

15. The computer-implemented method according to claim 13, further comprising:
retrieving, from the one or more data sources, the contextual data based at least in part on each of one or more sets of embeddings associated with the contextual data being within a predefined threshold vector distance of the embeddings of the refined query data.

16. The computer-implemented method according to claim 1, further comprising:
retrieving, from the computer database, the historical user dialogue data based at least in part on each of one or more sets of embeddings stored within the computer database that represent the historical dialogue data being within a predefined threshold vector distance of the set of embeddings of the unrefined query data.

17. The computer-implemented method according to claim 1, wherein each digital agent of the plurality of digital agents is implemented by at least one specially configured computer of the distributed network of computers that is encoded with unique logic for automatically executing one or more tasks based on a processing of the refined query, the at least one specially configured computer operably controlled by an instantiation signal from the one or more computers executing the digital agent classification system.

18. A computer-program product for an accuracy-enhanced processing of query data within a multi-digital agent architecture, the computer-program product comprising a non-transitory machine-readable storage medium storing computer instructions that, when executed by one or more processors, perform operations comprising:
at an adaptive query data processing service that is implemented by a network of distributed computers:
receiving, via a computer network, unrefined query data comprising textual data;
converting, by one or more computers executing one or more embeddings models, the unrefined query data to a set of embeddings of the unrefined query data;
using the set of embeddings to perform a search of a computer database storing historical user dialogue data,
automatically generating, by the one or more computers, a language model prompt based on a combination of the unrefined query data and given historical user dialogue data returned as a result of performing the search;
transforming, by one or more language models, the unrefined query data to refined query data based on an input of the language model prompt to the one or more language models, wherein the refined query data comprises improved query data that is restructured from the unrefined query data to enable an accurate processing by a downstream digital agent classification system,
generating, by one or more computers executing a digital agent classification model of the digital agent classification system, at least one digital agent classification inference based on an input of embeddings of the refined query data;
automatically applying to the refined query data, by the one or more computers executing the digital agent classification system, digital routing logic that, when applied:
automatically causes the one or more computers to select or identify a distinct digital agent of a plurality of digital agents for processing the refined query data of the adaptive query data processing service, and automatically routes the refined query data to the distinct digital agent of the plurality of digital agents of the adaptive query data processing service;

automatically instantiating an instance of the distinct digital agent for executing an accuracy-enhanced processing of the refined query data;

executing the accuracy-enhanced processing, by the one or more computers executing the distinct digital agent, the refined query data; and in response to the accuracy-enhanced processing, generating by the one or more computers executing the distinct digital agent a digital response to the unrefined query data; and returning, via the computer network, the digital response to an interactive graphical user interface that is in operable communication with the adaptive query data processing service.

19. The computer-program product according to claim 18, wherein the digital agent classification system was initialized prior to generating the at least one digital agent classification inference, and wherein the computer instructions, when executed by the one or more processors, perform initialization operations, the initialization operations comprising:

retrieving from computer memory, for each digital agent of the plurality of agents, a respective agent textual description data;

generating a respective language model prompt for each respective agent textual description data;

converting, by the one or more computers executing the one or more language models, each respective agent textual description data into a respective set of embeddings based on an input of each language model prompt; and storing the respective set of embeddings for each digital agent at one or more reference memories accessible to the one or more language models associated with the digital agent classification system.

20. A computer-implemented system for an accuracy-enhanced processing or query data within a multi-digital agent architecture, the computer-implemented system comprising:

one or more processors;

a memory; and a computer-readable medium operably coupled to the one or more processors, the computer-readable medium having computer-readable instructions stored thereon that, when executed by the one or more processors, cause a computing device to perform operations comprising:

at an adaptive query data processing service that is implemented by a network of distributed computers:

receiving, via a computer network, unrefined query data comprising textual data;

converting, by one or more computers executing one or more embeddings models, the unrefined query data to a set of embeddings of the unrefined query data;

using the set of embeddings to perform a search of a computer database storing historical user dialogue data, automatically generating, by the one or more computers, a language model prompt based on a combination of the unrefined query data and given historical user dialogue data returned as a result of performing the search;

transforming, by one or more language models, the unrefined query data to refined query data based on an input of the language model prompt to the one or more language models, wherein the refined query data comprises improved query data that is restructured from the unrefined query data to enable an accurate processing by a downstream digital agent classification system, generating, by one or more computers executing a digital agent classification model of the digital agent classification system, at least one digital agent classification inference based on an input of embeddings of the refined query data;

automatically applying to the refined query data, by the one or more computers executing the digital agent classification system, digital routing logic that, when applied:

automatically causes the one or more computers to select or identify a distinct digital agent of a plurality of digital agents for processing the refined query data of the adaptive query data processing service, and automatically routes the refined query data to the distinct digital agent of the plurality of digital agents of the adaptive query data processing service;

automatically instantiating an instance of the distinct digital agent for executing an accuracy-enhanced processing of the refined query data;

executing the accuracy-enhanced processing, by the one or more computers executing the distinct digital agent, the refined query data; and in response to the accuracy-enhanced processing, generating by the one or more computers executing the distinct digital agent a digital response to the unrefined query data; and returning, via the computer network, the digital response to an interactive graphical user interface that is in operable communication with the adaptive query data processing service.

* * * * *